US011505001B2

(12) United States Patent
Dyrlund et al.

(10) Patent No.: US 11,505,001 B2
(45) Date of Patent: Nov. 22, 2022

(54) METHOD FOR FORMING TIRE COMPONENTS

(71) Applicant: The Goodyear Tire & Rubber Company, Akron, OH (US)

(72) Inventors: Christopher David Dyrlund, Canton, OH (US); Jacob Steven Wood, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 158 days.

(21) Appl. No.: 16/597,206

(22) Filed: Oct. 9, 2019

(65) Prior Publication Data

US 2020/0198398 A1 Jun. 25, 2020

Related U.S. Application Data

(60) Provisional application No. 62/781,747, filed on Dec. 19, 2018.

(51) Int. Cl.
*B29D 30/62* (2006.01)
*B29C 48/37* (2019.01)
(Continued)

(52) U.S. Cl.
CPC ............... *B60C 1/00* (2013.01); *B29C 48/21* (2019.02); *B29C 48/25686* (2019.02);
(Continued)

(58) Field of Classification Search
CPC ......... B29C 48/07; B29C 48/18; B29C 48/21; B29C 48/2556; B29C 48/25686;
(Continued)

(56) References Cited

U.S. PATENT DOCUMENTS 3,268,970 A * 8/1966 Kelly .................. B29C 48/06
425/131.1
4,683,095 A 7/1987 Tolonen et al.
(Continued)

FOREIGN PATENT DOCUMENTS

CN 86103196 A 1/1987
CN 108463328 A 8/2018
(Continued)

OTHER PUBLICATIONS

European Search Report for Serial No. EP19217284 dated May 26, 2020.
(Continued)

*Primary Examiner* — Xiao S Zhao
*Assistant Examiner* — Joseph S Leyson
(74) *Attorney, Agent, or Firm* — Katherine A. Smith; June E. Rickey (57) ABSTRACT

One or more embodiments of the present invention provide a method for applying a dual compound coextruded continuous strip of a first compound and a second compound, the method comprising a first extruder for processing a first compound and a second extruder for processing a second compound, wherein the outlet from the first extruder is in fluid communication with a first channel of a housing, and the outlet from the second extruder is in fluid communication with a second channel of the housing, wherein a gear pump is positioned in each channel, wherein a nozzle is in fluid communication with an outlet of the first channel and an outlet of the second channel, and a coextruded continuous strip is produced. The ratio of the first compound to the second compound may be adjusted instantaneously.

10 Claims, 7 Drawing Sheets

(51) Int. Cl.
  *B29C 48/21* (2019.01)
  *B29C 48/49* (2019.01)
  *B60C 1/00* (2006.01)
  *B29D 30/06* (2006.01)
  *B29C 48/305* (2019.01)
  *B29C 48/25* (2019.01)
  *B29D 30/30* (2006.01)

(52) U.S. Cl.
  CPC ............ *B29C 48/307* (2019.02); *B29C 48/37* (2019.02); *B29C 48/49* (2019.02); *B29D 30/0678* (2013.01); *B29D 30/62* (2013.01); *B29D 2030/3064* (2013.01)

(58) Field of Classification Search
  CPC ... B29C 48/266; B29C 48/304; B29C 48/307; B29C 48/37; B29C 48/49; B29C 48/495; B29D 30/30; B29D 30/62
  See application file for complete search history.

(56) References Cited

U.S. PATENT DOCUMENTS

| | | | | |
|---|---|---|---|---|
| 4,832,590 | A | * | 5/1989 | Bellmer ................ B29C 48/256 425/185 |
| 9,738,045 | B2 | | 8/2017 | Burg et al. |
| 2007/0031529 | A1 | * | 2/2007 | Koch .................... B29D 30/08 425/376.1 |
| 2009/0107597 | A1 | | 4/2009 | Loewenhaupt et al. |
| 2012/0263906 | A1 | | 10/2012 | Ausen et al. |
| 2012/0318440 | A1 | | 12/2012 | Vargo et al. |
| 2015/0090381 | A1 | * | 4/2015 | Shimomura ........... B29D 30/60 152/209.5 |
| 2016/0031145 | A1 | | 2/2016 | Truscott |
| 2016/0059466 | A1 | | 3/2016 | Dyrlund et al. |
| 2017/0001360 | A1 | * | 1/2017 | Dyrlund .................. B29C 48/37 |
| 2017/0217072 | A1 | | 8/2017 | Hahn et al. |
| 2017/0361556 | A1 | | 12/2017 | Dyrlund et al. |
| 2018/0370074 | A1 | * | 12/2018 | Ougier ...................... B29B 7/60 |
| 2019/0152116 | A1 | | 5/2019 | Dyrlund et al. |

FOREIGN PATENT DOCUMENTS

| | | | |
|---|---|---|---|
| DE | 102014223160 | 5/2016 | |
| EP | 2535176 | 12/2012 | |
| FR | 3045441 A1 * | 6/2017 | .......... B29C 48/402 |
| JP | 2002103413 A | 4/2002 | |
| JP | 3515062 B2 | 1/2004 | |

OTHER PUBLICATIONS

Chinese Search Report for Serial No. 201911318267.4 dated Jul. 26, 2021.
Chinese Search Report for Serial No. 201911319095.2 dated Jun. 25, 2021.
Edited By F. Hansen [Germany], Translated by Yichong Guo et al., Plastics Extrusion Technology, Plastics Extrusion Technology, Jan. 31, 2001, 253-255, 2nd edition, China Light Industry Press, Beijing, CN.

* cited by examiner

METHOD FOR FORMING TIRE COMPONENTS

FIELD OF THE INVENTION

The invention relates in general to tire manufacturing and, more particularly, to a method for forming tire components and a tire.

BACKGROUND OF THE INVENTION

Tire manufacturers have progressed to more complicated designs due to an advance in technology as well as a highly competitive industrial environment. In particular, tire designers seek to use multiple rubber compounds in a tire component such as the tread in order to meet customer demands. Using multiple rubber compounds per tire component can result in a huge number of compounds needed to be on hand for the various tire lines of the manufacturer. For cost and efficiency reasons, tire manufacturers seek to limit the number of compounds available, due to the extensive costs associated with each compound. Each compound typically requires the use of a banbury mixer, which involves expensive capital expenditures. Furthermore, banbury mixers have difficulty mixing up tough or stiff rubber compounds. The compounds generated from the banbury mixers are typically shipped to the tire building plants, thus requiring additional costs for transportation. The shelf life of the compounds is not finite, and if not used within a certain time period, is scrapped.

Thus, it is desired to have an improved method and apparatus to produce a coextruded continuous strip of two compounds from a single application head. The inventors have discovered that a coextruded strip of two compounds wherein the volume ratio of the compounds may be varied results in a huge manufacturing advantage due to the complexity of tire designs that may be made in an efficient manner. The coextruded strip allows the manufacturing of complex tire component geometries to achieve specific improvements in performance and durability characteristics. Furthermore, a rotatable applicator head facilitates the formation of complex tire and/or tire component designs.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 6A is a cross-sectional view of a coextruded strip of 10% compound A and 90% compound B, while

DETAILED DESCRIPTION OF THE INVENTION

Figure 1:
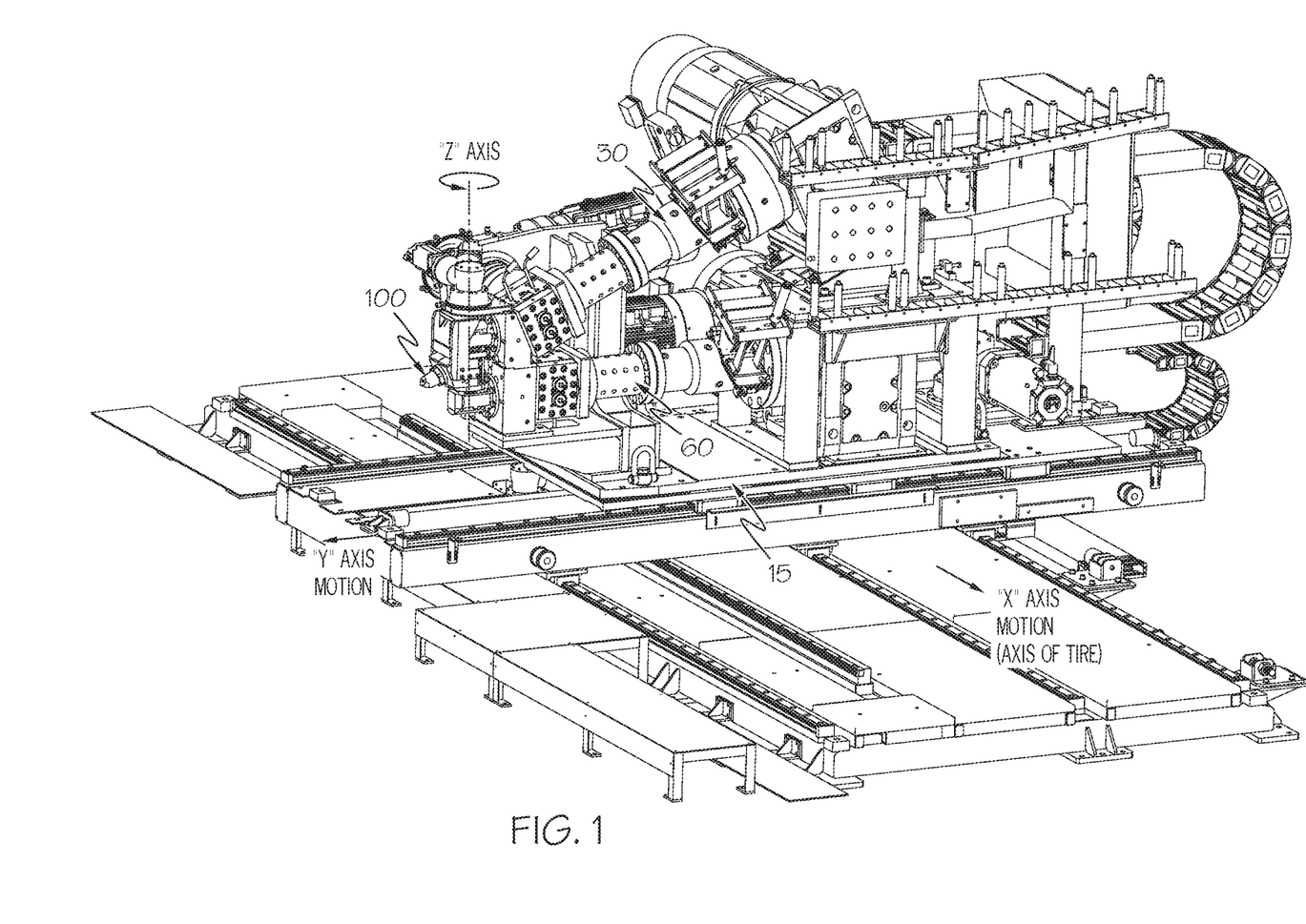
FIG. 1 is a perspective view of a dual compound extruder apparatus of the present invention.

FIG. 1 illustrates a first embodiment of a dual compound extruder apparatus 10 suitable for use for making rubber compositions for tires or tire components such as the tread. The dual compound extruder apparatus 10 is not limited to tire applications and may be used for example, to make other rubber components not related to tires such as conveyors, hoses, belts, etc. The dual compound extruder apparatus 10 is particularly suited for making a tread or small tire components having a varying composition, such as inserts, apexes and treads (including those for retreaded tires). The dual compound extruder apparatus 10 may extrude a continuous coextruded strip of two compounds directly onto a tire building drum, or tire carcass or component building apparatus.

The dual compound extruder apparatus 10 is mounted upon a support frame 15. A translatable support bar 16 is mounted to the upper end of the support frame. Preferably, the dual compound extruder apparatus 10 is mounted upon a translatable support bar 16, that can translate fore and aft in relation to a tire building machine 18. As shown in FIG. 1, the dual compound extruder apparatus 10 includes a support frame 15 (parts of which have been removed for clarity). The support frame 15 may further include support rails for translating the entire applicator apparatus in the X, Y and Z direction (not shown).

As shown in FIG. 1, the dual compound extruder apparatus 10 includes a first extruder 30 and a second extruder 60, preferably arranged side by side as shown. The first extruder 30 has an inlet 32 for receiving a first rubber composition A as described in more detail, below. The first extruder 30 is driven by motor 20. The second extruder 60 has an inlet 62 for receiving a second rubber composition B as described in more detail, below. The second extruder 60 is driven by electrical motor 50. The first or second extruder 30,60 may comprise any commercial extruder suitable for processing of rubber or elastomer compounds. The extruder may comprise a commercially available extruder commonly known by those skilled in the art as a pin type extruder, a twin screw or a single screw extruder, or a ring type of extruder. Preferably, the extruder has a length to diameter ratio (L/D) of about 5, but may range from about 3 to about 20. A pin type of extruder is preferred, but is not limited to same.

The first extruder inlet 32 receives a first compound A, examples of which are described in more detail, below. The first extruder 30 functions to warm up a first compound A to the temperature in the range of about 80° C. to about 150° C., preferably about 90° C. to about 120° C., and to masticate the rubber composition as needed. The output end 34 of the first extruder 30 is connected to an inlet end 43 of a first gear pump 42. Compound A is thus first extruded by the first extruder 30 and then pumped by the first gear pump 42 into a rotatable housing for facilitating flow into a coextrusion nozzle 100. The first gear pump 42 functions as a metering device and a pump and may have gears such as planetary gears, bevel gears or other gears.

The second extruder inlet 62 receives a second compound B, examples of which are described in more detail, below. The second extruder 60 functions to warm up the second compound B to the temperature in the range of about 80° C. to about 150° C., preferably about 90° C. to about 120° C., and to masticate the rubber composition as needed. The output end 64 of the second extruder 60 is connected to an inlet end 45 of a second gear pump 44. Compound B is thus extruded by the second extruder 60 and then pumped by the second gear pump 44, which functions as a metering device and a pump and may have gears such as planetary gears, bevel gears or other gears.

Figure 2:
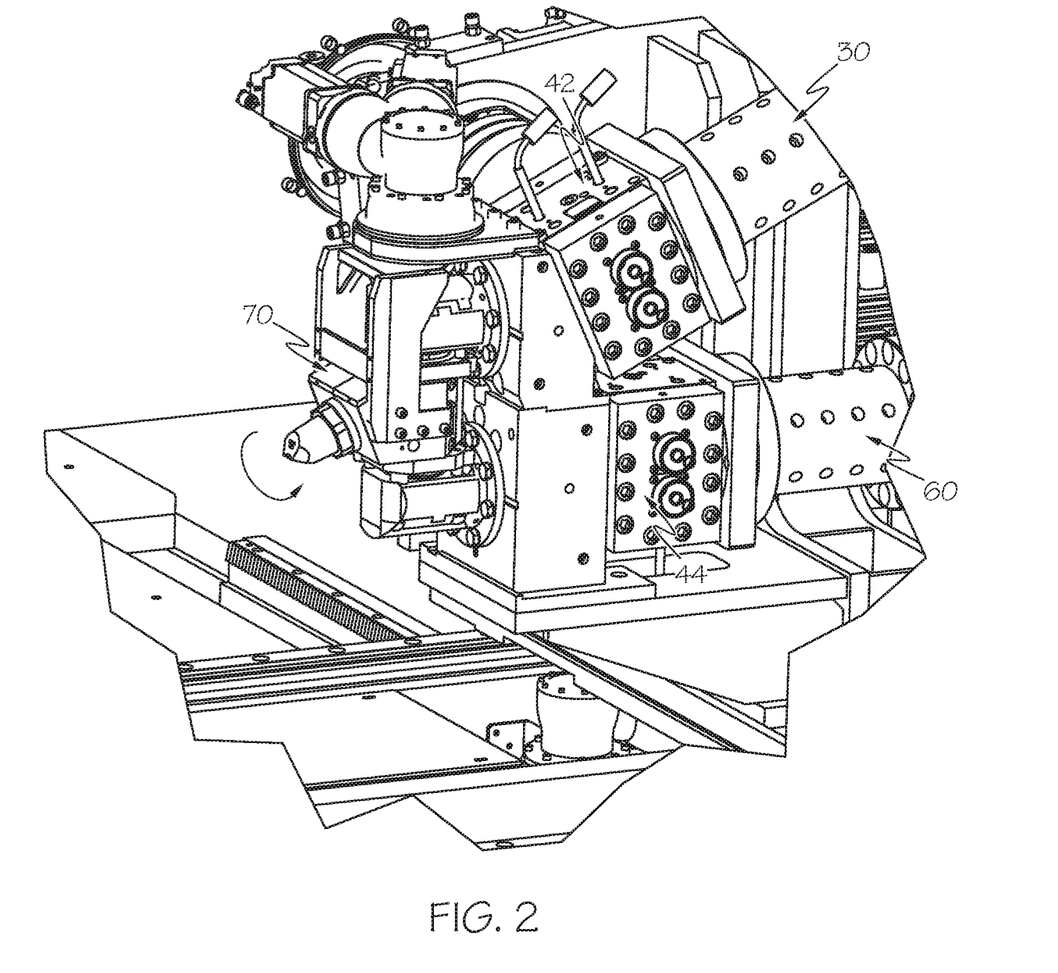
FIG. 2 is a close-up perspective view of a dual compound extruder apparatus of the present invention.
Figure 3:
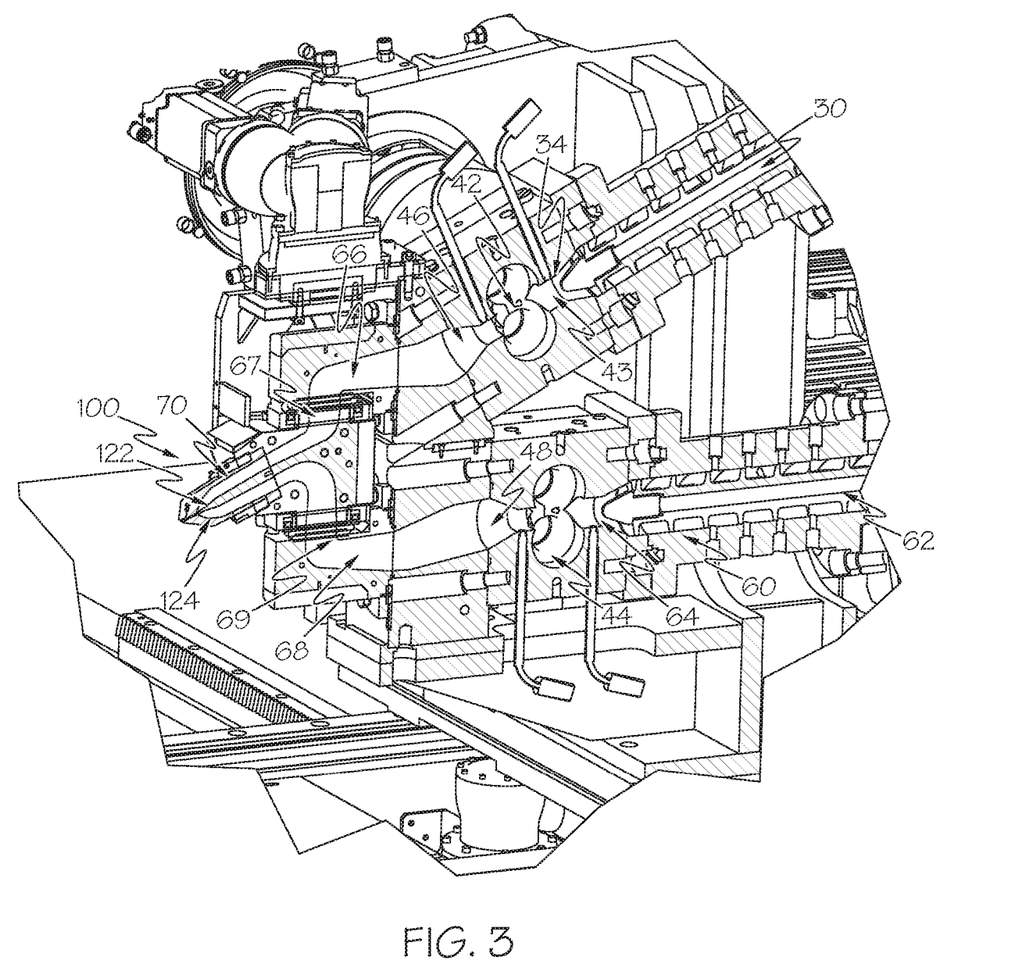
FIG. 3 is a cross-sectional view of the dual compound extruder apparatus of FIG. 2.

The first and second gear pumps 42,44 are preferably housed in a single housing 40 or placed in close proximity to each other so that the outlet channels 46,48 of the first and second gear pumps are also in close proximity, as shown in FIG. 2. The outlet channels 46,48 are fed into a first and second transition channel 66,68 which have a horizontal portion followed by a vertical portion 67,69 prior to entering a rotatable applicator head 70.

Rotatable Applicator Head

The rotatable applicator head 70 is rotatable about the Z axis, allowing the nozzle 100 to pivot or rotate. The compound A and compound B flow streams 67,69 enter the rotatable applicator head 70 in a direction parallel with the Z axis. The A and B flow streams 67,69 are decreased in area and angled downwardly prior to entering coextrusion nozzle 100.

The rotatable applicator head can rotate in the range of about, 200 degrees, or more typically about +/−150 degrees from the center position. Because the rubber material changes direction prior to entering the rotatable applicator head, the flow remains unaffected by the rotation of the applicator head. Since rubber or elastomers have memory, changing direction of the rubber material prior to rotation prevents the material from curling or otherwise having an undesirable non-uniform flow.

Nozzle Assembly 80

Figure 4:
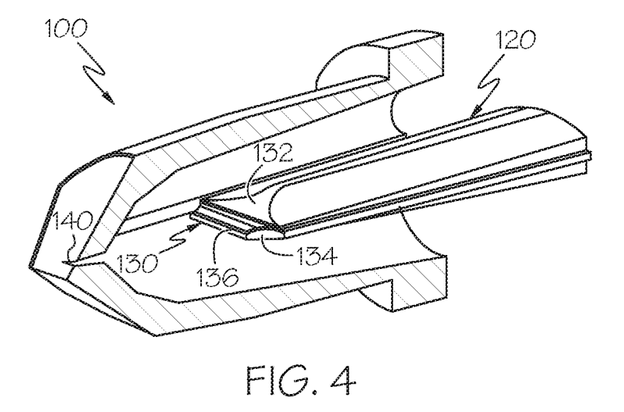
FIG. 4 is a perspective cutaway view of a coextrusion nozzle of the present invention.
Figure 5:
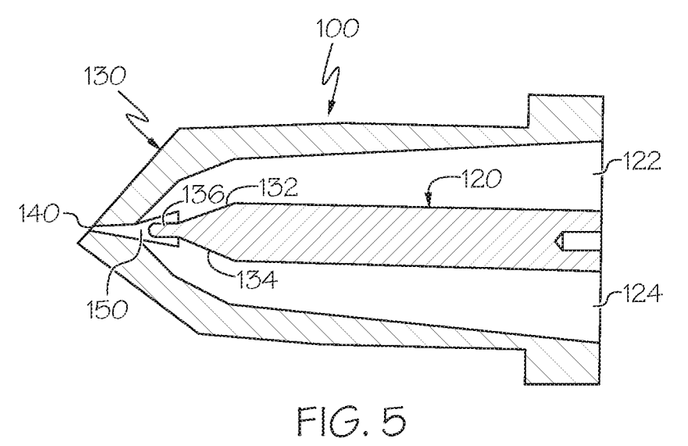
FIG. 5 is a side cross-sectional view of the coextrusion nozzle of FIG. 4.
Figure 6A:
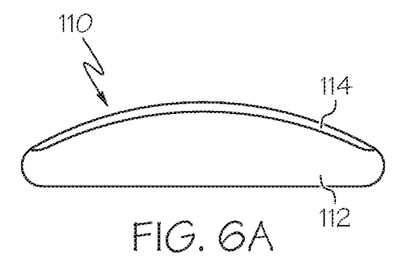
Figure 6B:
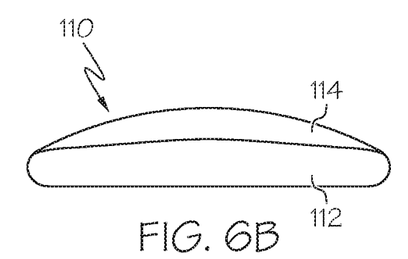
FIG. 6B is a cross-sectional view of a coextruded strip of 50% compound A and 50% of compound B.
Figure 7A:
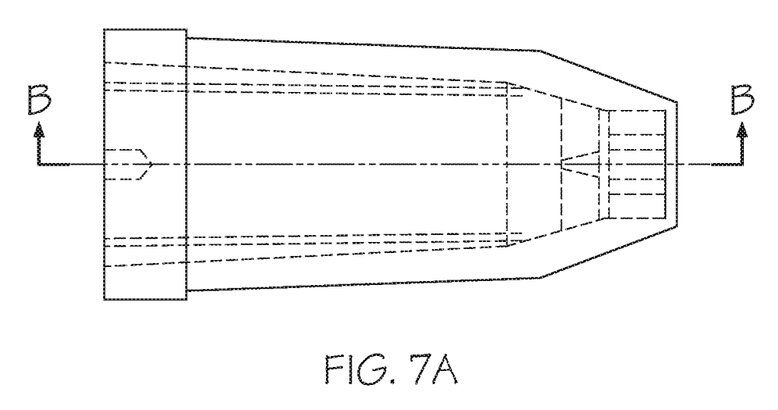
FIG. 7A is a top view of the coextrusion nozzle of FIG. 4.
Figure 7B:
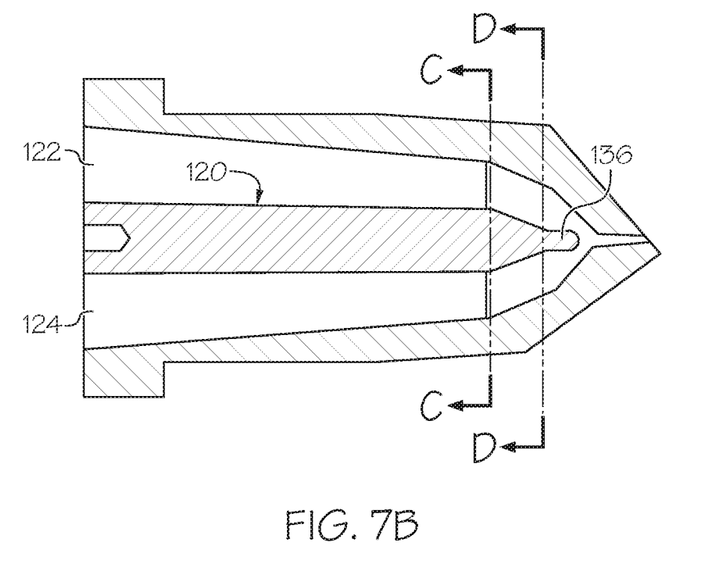
FIG. 7B is a cross-sectional view in the direction B-B of FIG. 7A.
Figure 7C:
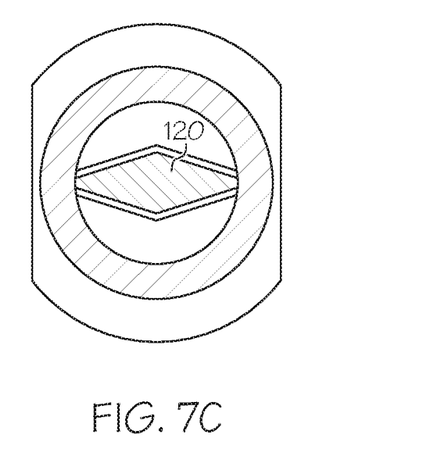
FIG. 7C is a cross-sectional view in the direction C-C of FIG. 7B.
Figure 7D:
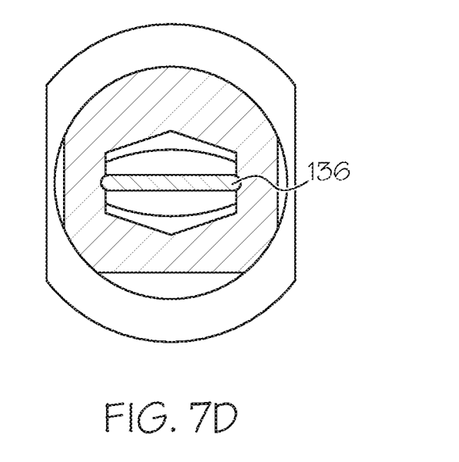
FIG. 7D is a cross-sectional view in the direction D-D of FIG. 7B.
Figure 7E:
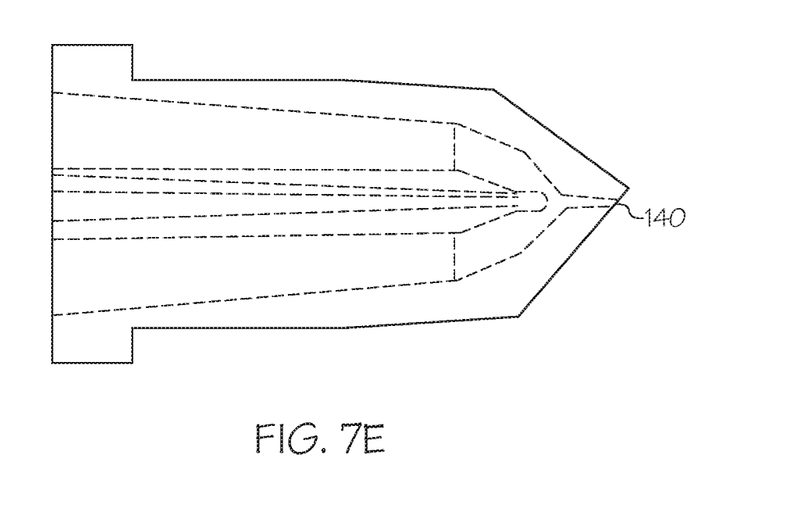
FIG. 7E is a cross-sectional side view of the coextrusion nozzle of FIG. 4.
Figure 7F:
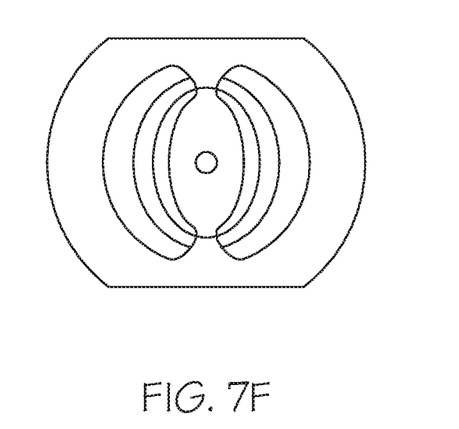
FIG. 7F is an end view of FIG. 7A.
Figure 7G:
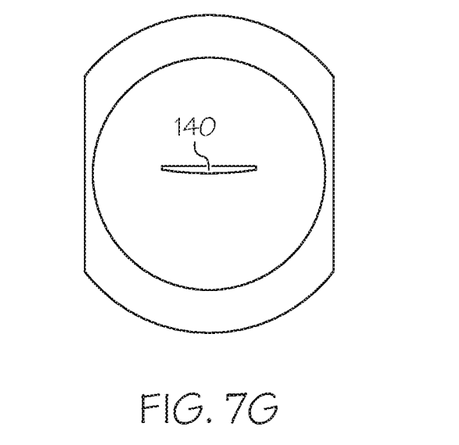
FIG. 7G is a front view of the coextrusion nozzle of FIG. 7A.

FIGS. 4-5 illustrate a coextrusion nozzle 100 suitable for use with the dual compound extruder apparatus 10 of the present invention. The coextrusion nozzle 100 is useful for forming a coextruded or dual compound continuous strip as shown in FIG. 6. The coextrusion nozzle 100 has a removable insert 120 that functions to divide the nozzle into a first and second flow passageway 122,124. The removable insert 120 is preferably rectangular in cross-sectional shape. The removable insert 120 has a distal end 130 with tapered ends 132,134 forming a nose 136. The nose 136 is positioned adjacent the nozzle die exit 140 and spaced a few millimeters from the die exit 140. The region between the nose 136 and the die exit 140 is a low volume coextrusion zone 150 that is high pressure. In the low volume coextrusion zone 150, compound A flowstream 122 merges with compound B flowstream 124.

The dual compound extruder apparatus 10 with the coextrusion nozzle 100 produces a coextruded strip 110 having a first layer 112 of a first compound A, and a second layer 114 of a second compound B. The first layer 112 and the second layer 114 are not mixed together, and are joined together at an interface in a coextrusion zone of the nozzle. The coextrusion zone is located upstream of the nozzle die, where the compound A flow stream joins with the compound B flow stream. FIG. 6A illustrates a coextruded strip formed of 10% compound A and 90% compound B, while FIG. 6B illustrates a coextruded strip of a 50-50 mix of compound A and B.

The dual compound extruder apparatus 10 can be used to vary the volume ratio of compound A to compound B by varying the ratio of the speed of gear pump of compound A to the speed of gear pump of compound B. The dual compound extruder apparatus 10 can adjust the speed ratios on the fly, and due to the small residence time of the coextrusion nozzle, the apparatus has a fast response to a change in the compound ratios. This is due to the low volume of the coextrusion zone. The dual compound extruder apparatus 10 with the coextrusion nozzle may be used to coextrude a dual compound strip in a continuous manner onto a tire building drum. The ratio of compound A to compound B may be varied by changing the speed ratio of the gear pumps.

The width of the rubber strip output from the nozzle orifice is typically about 15 mm in width, but may vary in the range of about 5 mm to about 30 mm. The nozzle may be optionally heated to a temperature in the range of about 0 to about 230 degrees F., preferably in the range of about 0 to about 200 degrees F., using external or internal heaters (not shown).

As shown in FIG. 1, the nozzle 100 is oriented with respect to the tire building drum A, core (not shown) or other application surface typically at an angle β in the range of about 0 to about 90 degrees, more typically in the range of about 35-90 degrees. It is preferred that the rubber output from the nozzle be oriented about 90 degrees relative to the application surface, although α may range from about 35-90 degrees.

The nozzle is oriented at an angle with respect to a tire building surface or core. The nozzle assembly is capable of translating in two directions in discrete index positions in order to accurately apply the rubber to the building surface. The support surface can be a toroid shaped core or a cylindrical shaped tire building drum, or any other desired shape. The primary advantage of applying the strip to a toroidally shaped surface is the finished part is accurately positioned in a green uncured state at the proper orientation to be molded without requiring any change in orientation from the condition in which the strip was initially formed.

The extrudate exits the nozzle in a strip form, having the desired shape of the exit orifice of the nozzle. If a drum or toroid is used as an applicator surface, as the drum or core rotates, a continuous annular strip may be formed. The nozzle can be indexed axially so to form the desired shape of the component. The nozzle can be controlled by a control system wherein the movement of the nozzle so that the multiple layers of strip dictates the shape of the desired tire component.

The profile of each formed component can be varied in a fashion such that the cross-sectional thickness is very thin as in the tip of an apex or thick near the bead core. Also, the entire profile can be thin as in a liner component. For example, the entire profile may have a thickness range from 0.8 mm to 3 mm. The nozzle can articulate moving in numerous directions the numerous degrees of freedom enabling the nozzle/tongue assembly to form flat, convex or concave curvatures as the material is spread. In addition, the numerous degrees of freedom allow the components such as a sidewall to be built. What is important to note is some or all of these tire components can be formed using this technique of the present invention. The tire manufacturer simply can choose which components can be most efficiently produced using this technique.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for forming a coextruded strip of a first compound and a second compound, the method comprising the steps of:

extruding a first compound through a first extruder and a first gear pump and into a first passageway of a coextrusion nozzle while extruding a second compound through a second extruder and a second gear pump and into a second passageway of the coextrusion nozzle; and forming a continuous coextruded dual compound strip, wherein the coextrusion nozzle has an insert having a diamond-shaped cross-section at an inlet end that transitions to a rectangular cross-section at a distal end that tapers to a nose, wherein the insert divides the coextrusion nozzle into the first and second passageways.

2. The method of claim 1 wherein the continuous coextruded dual compound strip is applied to a tire building drum.

3. The method of claim 2 wherein the coextrusion nozzle is rotated while applying to the tire building drum.

4. The method of claim 1 wherein the coextrusion nozzle is mounted upon a rotatable head.

5. The method of claim 1 wherein the first and second passageways are joined together immediately upstream of a die outlet of the coextrusion nozzle.

6. The method of claim 1 wherein the distal end of the insert is positioned adjacent a die outlet of the coextrusion nozzle.

7. The method of claim 1 wherein a ratio of a volume of the first compound to the second compound is varied by changing a ratio of a speed of the first gear pump to the second gear pump.

8. The method of claim 7 wherein the ratio of the speed of the first gear pump to the second gear pump may be varied instantaneously.

9. The method of claim 1 wherein the strip is applied in a continuous manner to build a tire component.

10. A method for forming a dual layer coextruded strip of a first compound A and a second compound B, the method comprising the steps of:

extruding a first compound A through a first extruder and a first gear pump and into a first passageway of a coextrusion nozzle;

extruding a second compound B through a second extruder and a second gear pump and into a second passageway of the coextrusion nozzle;

wherein the coextrusion nozzle has an insert having a diamond-shaped cross-section at an inlet end that transitions to a rectangular cross-section at a distal end that tapers to a nose, wherein the insert divides the coextrusion nozzle into the first and second passageways;

wherein the coextrusion nozzle is mounted upon a rotatable head; and wherein the first and second passageways are joined together immediately upstream of a die outlet of the coextrusion nozzle, and forming coextruded dual layer strip and applying the dual layer coextruded strip to a tire building drum while rotating the coextrusion nozzle.

\* \* \* \* \*